March 23, 1965  H. A. KNELL  3,174,255
SUPPORT STRUCTURE FOR TOMATO PLANT
Filed March 18, 1963
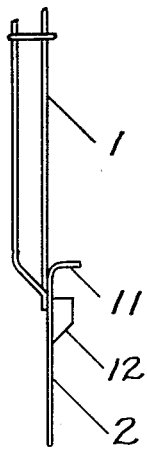
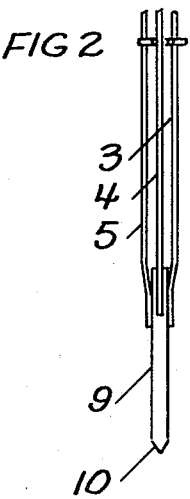
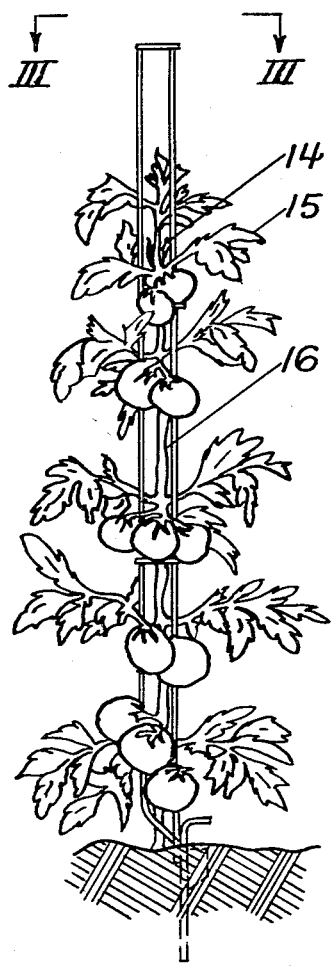
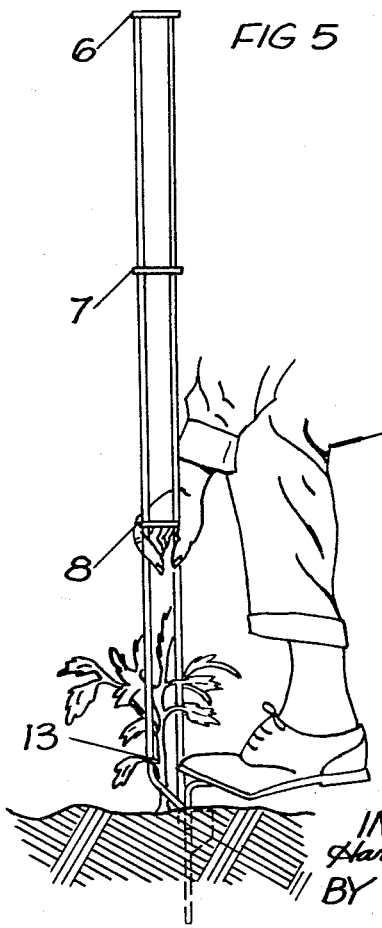
INVENTOR
Harvey A. Knell
BY Charles Connor
ATTORNEY

United States Patent Office 3,174,255
Patented Mar. 23, 1965

3,174,255
SUPPORT STRUCTURE FOR TOMATO PLANT
Harvey A. Knell, 2219 Douglas St., Joliet, Ill.
Filed Mar. 18, 1963, Ser. No. 266,100
1 Claim. (Cl. 47—45)

This application relates to a device for the support of pruned tomato plants.

An object of this invention is to provide a structure for supporting a pruned tomato plant which surrounds the stem of the plant in a manner that eliminates tying the stem to a support without the structure interfering with the picking or the growth of the fruit.

A further object of this invention is to provide a structure for supporting a pruned tomato plant which can be installed on the plant at transplating time and removed from the mature plant at the end of the growing season as a structural unit.

A further object of this invention is to provide a substantial support for a pruned tomato plant which can be installed on the young newly transplated plant and removed from a mature plant at the end of the growing season without the use of any tools.

A further object of this invention is to provide a structure which confines the lateral movement of the stem of a tomato plant so that buckling of the stem is prevented and the stem retains sufficient columnar strength to remain upright under the weight of the fruit and foliage.

Additional objects and advantages derived from the use of the device will be apparent after referring to and considering the description hereinafter set forth in connection with the drawing annexed hereto, wherein the elements comprising the device are shown and identified by certain numerals.

FIGURE 1 is a side view of the lower portion of the tomato plant support.

FIGURE 2 is a front view of the lower portion of the tomato plant support.

FIGURE 3 is a top view of a fruit producing tomato plant held up by the tomato plant support.

FIGURE 4 is a side view of a fruit producing tomato plant held up by the tomato plant support.

FIGURE 5 is a side view of the tomato plant support being installed on a young tomato plant.

The support assembly 1 and the anchor base assembly 2 are fastened together to make the tomato plant support. The support assembly consists of vertical members 3, 4 and 5 and horizontal ties 6, 7 and 8. As shown in FIGURES 1, 2, and 3 each vertical member is fastened to the horizontal ties 6, 7 and 8 so that the vertical members 3, 4 and 5 are substantially parallel and an equal distance apart. As shown in FIGURE 3, the identical cross ties 6, 7, and 8 are circularly shaped with a portion removed. These cross ties have no function except to keep the vertical members in a rigid parallel relationship. Vertical members 3, 4 and 5 are identical except members 3 and 5 have bends at the lower ends which locate the lower ends of the member 3, 4 and 5 in the same plane to facilitate fastening the support assembly 1 to the anchor base assembly 2.

The anchor base assembly 2 consists of two pieces; a shank 9 which has a sharpened lower end 10 and a foot driver 11 made by bending the top portion of the shank to a horizontal position; and a lateral stabilizer 12 which is fastened to the shank 9.

As shown in FIGURE 5, the tomato plant support is installed on the young tomato plant by centering the vertical members 3, 4, and 5 of the support assembly 1 around the stem of the young tomato plant and then applying enough force to the foot driver 11 to force the anchor base assembly 2 into the soil.

To use this invention the tomato plant must be suckered in the same manner as when stakes or other means of support are used. Referring to FIGURE 4, suckering is accomplished by removing all of the auxiliary buds 14 that emerge at the junction of each leaf branch 15 and the stem 16. Care is taken not to remove the terminal bud 17 at the top of the plant.

Refer to FIGURES 3 and 4 for the following explanation of how the tomato plant support holds up the suckered plant. The terminal bud 17 at the top of the stem 16 is kept centered between the vertical members 3, 4 and 5 as the plant grows. Leaf branches 15, fruit branches 18, and the stem 16 develop from this terminal bud. As the stem 16, leaf branches 15, and fruit branches 18 develop from the terminal bud 17, the leaf branches 15 and the fruit branches 16 extend randomly through the spaces between members 3, 4 and 5. The stem 16 together with the fruit branches 18 and the leaf branches 15 will not pass through the spaces between members 3, 4 and 5. This condition keeps the stem inside the support assembly 2 and gives the plant support without tying to secure the stem to a stake or other means of support.

The cross sectional area of the stem 16 is smaller towards the top of a suckered tomato plant. Since the vertical members 3, 4 and 5 are parallel, the fruit branches 18 and the leaf branches 15 emanating randomly from the stem through the spaces between the member 3, 4 and 5 are much more important in containing the stem near the top of the plant than near the base of the plant where the older larger portion of the stem is almost always larger than the space between any two of the members 3, 4 and 5.

At the end of the tomato growing season the dead plant is removed from the support assembly 1 by pulling the stem and leaflets through the open side between vertical members 3 and 5. Then the foot driver 11 is used as a handle to pull the tomato plant support from the soil.

I claim:

A plant support comprising an anchor stake shaft, a stake driver having a flat surface, said driver being secured to the top of said anchor stake in such position relative to the anchor stake shaft that when the latter is vertical said flat surface lies in a horizontal plane which is perpendicular to the longitudinal axis of said stake shaft, a stem encircling portion, said stem encircling portion consisting of at least one support member which is horizontal when said anchor stake is vertical and three rods with the latter so connected to said anchor stake shaft as to extend upwardly therefrom in mutual parallelism above said driver surface when the stake shaft is vertically disposed, said horizontal support member being secured to each of the three rods and being discontinuous between two of said rods; said driver and said stake being so connected to said rods as to lie outside a circle circumscribing said parallel portions of said rods and adjacent the continuous portion of said horizontal support.

References Cited by the Examiner
UNITED STATES PATENTS
917,655 4/09 Pittman et al. _____ 47—45 X FOREIGN PATENTS
61,384 4/92 Germany.
18,196 8/03 Great Britain.
24,093 11/05 Great Britain.
613,721 12/48 Great Britain.
72,000 3/16 Switzerland.

T. GRAHAM CRAVER, *Primary Examiner.*